(No Model.)

R. W. GORDON.
GALVANIC BATTERY.

No. 580,523. Patented Apr. 13, 1897.

Witnesses
Jas. J. Maloney.
Harry P. Ford.

Inventor,
Ralph W. Gordon,
by Jn. P. Livermore
Atty.

UNITED STATES PATENT OFFICE.

RALPH W. GORDON, OF BOSTON, MASSACHUSETTS, ASSIGNOR TO THE GORDON-BURNHAM BATTERY COMPANY, OF PORTLAND, MAINE, AND NEW YORK, N. Y.

GALVANIC BATTERY.

SPECIFICATION forming part of Letters Patent No. 580,523, dated April 13, 1897.

Application filed October 1, 1894. Serial No. 524,623. (No model.)

*To all whom it may concern:*

Be it known that I, RALPH W. GORDON, of Boston, county of Suffolk, State of Massachusetts, have invented an Improvement in Galvanic Batteries, of which the following description, in connection with the accompanying drawings, is a specification, like letters on the drawings representing like parts.

The present invention relates to a primary or galvanic battery; and it consists, mainly, in a novel and improved construction of such a battery in which a solution of caustic soda is used for the exciting fluid and black oxid of copper as the depolarizing agent.

The object of the invention is to provide a battery in which a more perfect consumption of the several elements is possible than in batteries of this class heretofore constructed, the arrangement being such that the depolarizing agent is to the fullest extent exposed to the action of the exciting fluid, while the positive element may be consumed to the fullest extent without destroying the action of the battery.

Figure 1:
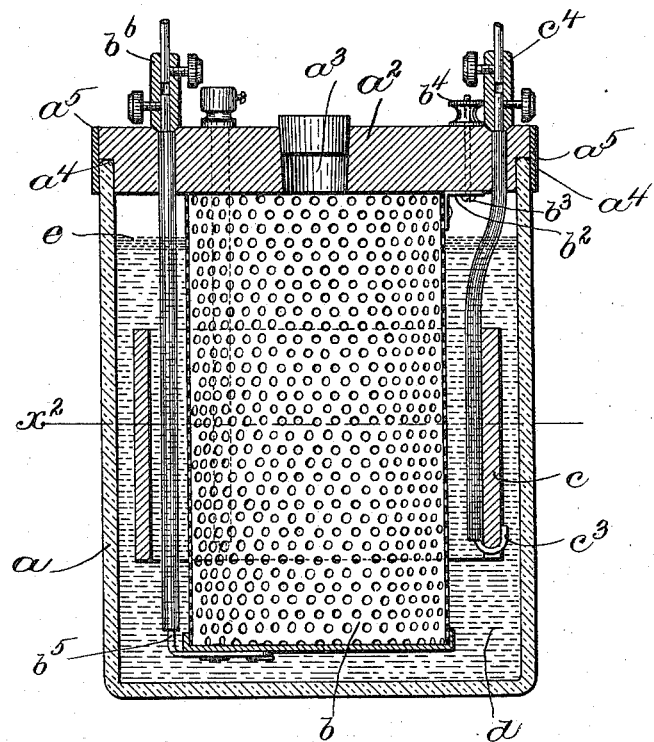
Figure 2:
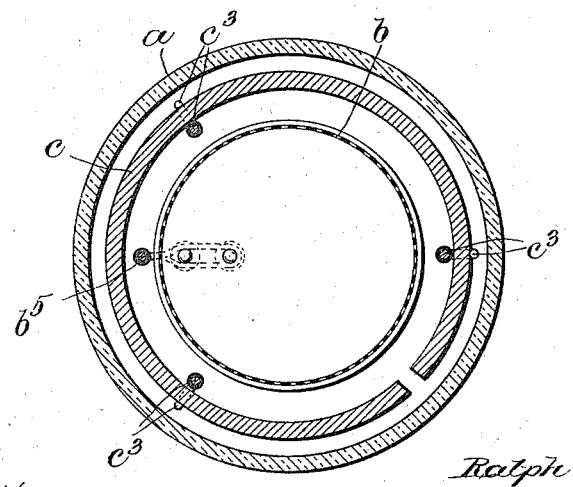

Figure 1 is a vertical section of a cell embodying the present invention, and Fig 2 is a horizontal section of the same on the line $x^2$ of Fig. 1.

The exciting fluid $d$ is contained in a receptacle $a$, preferably a glass jar, the said jar being provided with a cover $a^2$, fitting tightly thereon, from which are suspended a positive element $c$ and a negative element $b$, the latter consisting of a cylindrical receptacle having perforated walls and being adapted to contain the depolarizing agent, which consists of black oxid of copper in granulated form.

In order to obviate the necessity of removing the cover $a^2$ when the cell is to be recharged, the said cover is provided with a central opening $a^3$, provided with a suitable stopper, and the cover itself is rendered practically air-tight by means of a band $a^5$ of resilient material, such as rubber, extending around the outer edge of the said cover and the walls of the jar, as shown, the cover being preferably shouldered at $a^4$. The positive electrode $c$ consists of an annular plate or cylinder of zinc suspended from the cover $a^2$ by means of hooked rods $c^3$, adapted to engage therewith. One at least of the said rods is provided with a binding-socket $c^4$, to which may be secured the positive conductor of the circuit, as shown. The negative element $b$, which, as has been described, forms a receptacle for the depolarizing agent, may be secured to the cover in any suitable way, preferably, as shown, by brackets $b^2$, through each of which extends a screw $b^3$, which screw also passes through the cover and is secured to the outside thereof by means of a thumb-screw $b^4$, thus rendering the said negative element readily detachable from the cover. The conductor $b^5$ is connected to the lower part of the said receptacle $b$ and extends upward through the cover $a$, being secured in a binding-post $b^6$, to which may be connected the negative wire of the external circuit. In order to prevent short-circuiting, the suspending rods $c^2$ and the conductor $b$, which extend upward between the positive and negative elements, are covered with insulating material, thus effectually preventing any possible electrical contact of the two elements within the jar.

It being essential for the best operation of the cell in which the aforesaid elements are utilized that the air should be carefully excluded therefrom, it is preferable after the cell is charged to pour in a thin layer of oil $e$, which forms an effectual seal.

I do not intend herein to claim, broadly, the combination of a negative element having perforated walls and adapted to contain a depolarizing agent with a positive element, both suspended in a jar and surrounded by an exciting fluid, since I am aware that such construction is not novel and has been disclosed in prior patents.

I claim—

In a battery-cell containing an exciting fluid, the combination with a cover for the cell, of a negative element secured to and dependent from said cover and consisting of a cylindrical receptacle having perforated walls, a depolarizing agent contained in said receptacle, a positive element consisting of an annular plate or cylinder of zinc surrounding said negative element, insulated suspending rods or wires for said positive element secured at their upper ends to the cover and extending downward therefrom between the said elements and provided with supporting portions at their lower ends for said positive element, and an insulated conductor connected at its lower end with said negative element and extending upward between said negative element and the positive element and through the cover of the jar, said conductor being provided with a binding-post for one terminal of the circuit, and one of said suspending rods being provided with a binding-post for the other terminal of the circuit, substantially as described.

In testimony whereof I have signed my name to this specification in the presence of two subscribing witnesses.

RALPH W. GORDON.

Witnesses:
  M. E. HILL,
  JAS. J. MALONEY.